United States Patent
Bodlaender

(10) Patent No.: US 8,032,648 B2
(45) Date of Patent: Oct. 4, 2011

(54) APPARATUS AND METHOD FOR REPLACING A MEDIA CONTENT ITEM

(75) Inventor: Maarten Peter Bodlaender, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1234 days.

(21) Appl. No.: 10/532,470

(22) PCT Filed: Sep. 26, 2003

(86) PCT No.: PCT/IB03/04286
§ 371 (c)(1),
(2), (4) Date: Apr. 22, 2005

(87) PCT Pub. No.: WO2004/038966
PCT Pub. Date: May 6, 2004

(65) Prior Publication Data
US 2005/0273515 A1    Dec. 8, 2005

(30) Foreign Application Priority Data
Oct. 28, 2002  (EP) ...................................... 02079488

(51) Int. Cl.
G06F 15/16   (2006.01)
H04N 7/10    (2006.01)
H04N 7/16    (2011.01)

(52) U.S. Cl. ............... 709/231; 725/28; 725/32; 725/34
(58) Field of Classification Search .................. 709/231; 725/28, 32, 34
See application file for complete search history.

(56) References Cited

U.S. PATENT DOCUMENTS

| | | | |
|---|---|---|---|
| 6,546,427 B1 * | 4/2003 | Ehrlich et al. ................. | 709/231 |
| 7,190,415 B2 * | 3/2007 | Iwamoto et al. ............... | 348/731 |
| 2003/0016253 A1 * | 1/2003 | Aoki et al. ..................... | 345/863 |
| 2004/0114052 A1 * | 6/2004 | Sin ................................. | 348/570 |
| 2004/0261096 A1 * | 12/2004 | Matz .............................. | 725/28 |
| 2004/0261099 A1 * | 12/2004 | Durden et al. ................. | 725/32 |

FOREIGN PATENT DOCUMENTS
WO   WO 9937045 A1    7/1999

* cited by examiner

Primary Examiner — Joseph Avellino
Assistant Examiner — Jeong S Park

(57) ABSTRACT

An apparatus for outputting a media content item includes a receiver arranged to receive a first media content item, and an output device arranged to output the first item to a user. A selection device is provided for user-operably inputting a command to replace the first item at a particular moment of outputting the first item. Further, a time-estimating device is arranged to estimate, upon inputting the command, an estimated period of time necessary for outputting the remaining part of the first item. A search device is arranged to search for at least one second media content item, wherein a duration of the second item is substantially equal to the estimated period of time.

19 Claims, 2 Drawing Sheets

APPARATUS AND METHOD FOR REPLACING A MEDIA CONTENT ITEM

The invention relates to an apparatus for outputting a media content item, the apparatus comprising a receiver arranged to receive a first media content item, and output means arranged to output said first item to a user.

The invention also relates to a method of outputting a media content item, the method comprising a step of receiving a first media content item, and a step of outputting said first item to a user.

Document WO99/37045 discloses a digital radio broadcast system providing interactive features of skip forward and skip backward. Data may be transmitted at a faster than real time rate and accumulated in a buffer at a receiver. Alternatively, two or more programming channels may be communicated so that a user can move directly from a current track to the beginning of a track on another channel. The user can play a current track or skip to subsequent or earlier tracks. Data may also be transmitted which designates access points for program segments to allow the user to skip forward or backward to a program segment which is stored in the buffer while playing current program segments.

An application of such a system is limited to the digital radio broadcast. The proposed ways of transmitting and/or receiving the data may not be suitable for some broadcasters and/or users.

The user is limited to choosing only between tracks or segments which are provided by the broadcaster and can be stored in the buffer. At the same time, the user may not like any of the content which is stored in the buffer.

It is an object of the present invention to obviate the drawback of the prior art, and to provide an apparatus enabling the user to replace the media item in a user-friendly and unlimiting manner.

This object is realized in that the apparatus of the present invention is characterized by selection means for user-operably inputting a command to replace said first item at a particular moment of outputting said first item, and time-estimating means arranged to estimate, upon inputting said command, a period of time necessary for outputting a remaining part of said first item, and search means arranged to search for at least one second media content item, wherein a duration of said at least one second item is substantially equal to said period of time.

In this way, when the first media content item, e.g. a song, is outputted, the user may instruct the apparatus to skip this first item. Usually, the user would like to skip the first item after it has been outputted for some time. The period of time, a duration of the remaining part of said first item from the particular moment of inputting the user command to skip said first item till the end of outputting said first item may be estimated by said time-estimating means. Another item may be outputted after said estimated period of time, for example, as in broadcast radio wherein audio content items are broadcast one after another.

The time-estimating means may be arranged to estimate said period of time by estimating a duration of the outputted part of the first item, determining a total duration of the first item, and deducting the duration of the outputted part of the first item from the total duration of the first item. To estimate the duration of the outputted part of the first item, the time estimating means may comprise a timer counting the current time in the apparatus. The total duration of the first item may be determined, for example, by identifying said first item in a database storing data pertaining to a duration of a plurality of media content items.

For replacing said first item, one or many second items each of which has a duration equal or approximately equal to said estimated period of time may be searched for by said search means. The apparatus may locally store media content items, e.g. by recording broadcast songs. If more than one of such second items is found, one of them may be selected on the basis of user preferences or other criteria. Then, the second item which fits this period of time may be outputted by the output means.

A time of searching said second item may be estimated by said time-estimating means. The outputting of the first item may be interrupted not immediately after the moment of user-operably inputting the command to skip the first item but upon expiration of said searching time when the second item is presumably found. Alternatively, the outputting of the first item may be interrupted only when the second item is found.

The object is also realized in that the method of the present invention is characterized by a step of user-operably inputting a command to replace said first item at a particular moment of outputting said first item, a step of estimating, upon inputting said command, a period of time necessary for outputting a remaining part of said first item, and a step of searching for at least one second media content item, wherein a duration of said at least one second item is substantially equal to said period of time.

The method describes the steps of operation of the apparatus according to the present invention.

These and other aspects of the invention will be further elucidated and described with reference to the accompanying drawings, wherein.

Figure 1:
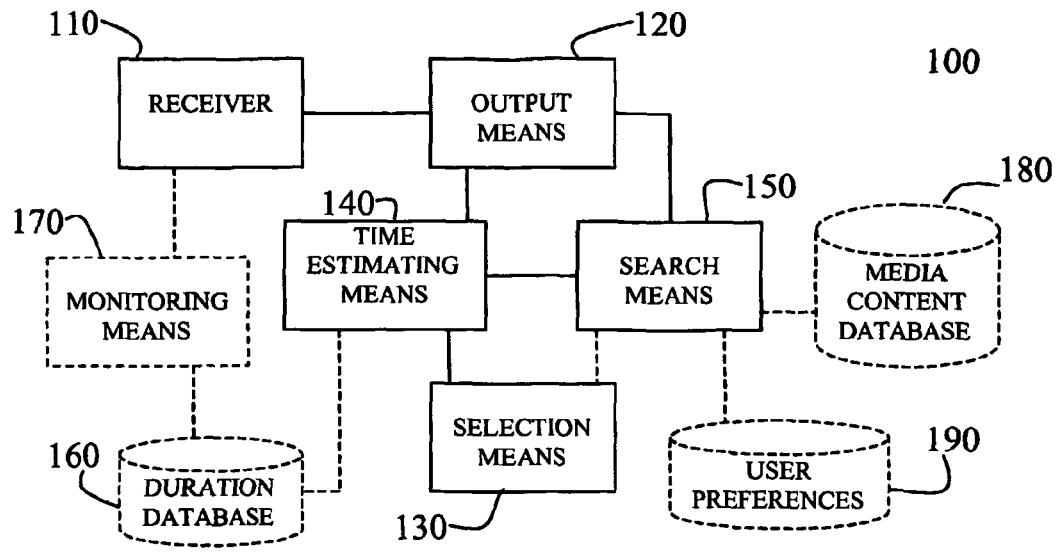
FIG. 1 shows a functional block diagram of the apparatus suitable for implementing the present invention.

FIG. 1 shows a functional block diagram of an embodiment of the apparatus 100. The apparatus comprises a receiver 110 for receiving media content items, e.g. songs, broadcast programs such as radio programs, etc. The apparatus also comprises output means 120 for outputting at least one media content item to a user, i.e. reproducing the song or other audio content, selection means 130 enabling the user to input a command to replace the media content item at a particular moment of outputting said item by said output means 120. For example, a situation in which the user does not like the content being reproduced may happen quite often with broadcast content, and the user may input the command to stop and replace outputting said content. The selection means 130 may be implemented with generally known input devices such as a remote control unit, keyboard, pointing device like a mouse, etc.

The apparatus 100 includes time-estimating means 140 and search means 150. The time estimating means 140 are arranged to estimate a duration of a remaining part of the media item to be skipped, upon the user inputting the command to replace the media item at a particular moment of outputting said item. The time-estimating means may be coupled to the selection means 130, output means 120 and search means. The search means 150 may also be coupled to the output means and selection means, and said means are arranged to search for at least one second media content item suitable for replacing the first item being outputted at the moment of inputting the user command. The search means may search for one or many second media items, whose duration may be substantially equal to the duration of the remaining part of the first media item to be skipped. Alternatively, the search means may search for two or more second items, a total duration of which may be substantially equal to the duration of the remaining part of the first media item to be replaced.

The duration of the remaining part of the media item to be skipped may be estimated in many ways. For example, the time-estimating means may determine a starting time of reproducing the first item to be replaced, and a time of user inputting the command for replacing said first item. In this way, a duration of the part of the first item which has been outputted is estimated. When a total duration of the first item is known, the duration of the remaining part of the media item may be found.

In one example, the total duration of the first item may be obtained from a broadcaster that transmits digital broadcast signals including the first media content item and meta-data comprising information pertaining to said first item such as its total duration. In a further example, a stream of digital information having segments which are provided with time stamps may be transmitted with such digital signals. Values of such time stamps may start from zero at the beginning of the first item till the total duration of the first item. In this way, the time-estimating means may obtain the duration of the part of the first item which has been outputted from a time stamp of segment being outputted at the moment of user inputting the command to replace said first item.

In another example, the total duration of the first item may be determined by first identifying the first item in a duration database 160 storing data pertaining to a duration of a plurality of media content items, and then retrieving from said database the total duration of said first item. The duration database may store a plurality of records comprising duration data and identification data. The identification data may comprise information necessary for the time estimating means to identify a particular media item in the duration database and retrieving the total duration from the duration corresponding to said item. For instance, the identification data may be merely a title of the media item. The title of the first item may be incorporated in the meta-data transmitted to the apparatus 100 together with the first media content item itself, but the total duration of the first item may not be included in the meta-data. Then, such a title may be used for identifying the first item in the duration database. Alternatively, the identification data may be simply media data corresponding to a part of the first item, sufficient to identify this song, or other data. To identify the first media item, the time-estimating means may compare the part of the first item which has been outputted with said identification media data pertaining to the various items in the database 160. In that case, no additional information such as the meta-data are necessary at all, and the invention may be implemented with the traditional broadcast systems without special formats of media content for including additional information about said media content, such as the identification information.

In one of the embodiments of the present invention, the apparatus 100 may optionally include monitoring means 170 arranged to store in the duration database 160 the total duration of a particular item upon completion of receiving said particular item. The monitoring means may be arranged to continuously analyze the items received by the receiver 110 by identifying the particular item in the duration database 160 and verifying whether the duration data for the particular item is present in said database. If the item cannot be identified in the database, the monitoring means add the record with the identification data and duration data for this item as it is specified above upon completion of receiving said item. If the item is identified in the database but no duration data for this item are stored in the database, the monitoring means add the respective duration data to the record of this item in the database upon completion of receiving said item. In that way, the duration data for the particular item may be added to said duration database.

The search means 150 may be arranged to search for at least one second media content item using a plurality of media information sources such as remote media content storage remotely located at the Internet or a local network, media content stored in various formats at different locations and accessible via specialized search engines in the Internet, and so on. Particularly, the search means may be coupled to a local media content database 180 storing a plurality of media content items in any of the known formats. Said database 180 may store data pertaining to the duration of the items or the duration may be calculated whenever the particular item is requested. Having found more than one second media content item, each of which has the duration substantially equal to the duration of the remaining part of the first item estimated by the time-estimating means, one of the found second media items may be selected for further outputting by the output means 120. The search means may select one of the found second items on the basis of various criteria such as the second item which may be more preferred by the user according to user preferences 190 stored in the apparatus. Each of the found second items stored in the media content database may be rated in accordance with the user preferences as it is known in the prior art, and then the second item having the highest score may be selected.

The apparatus may be arranged to indicate a low rating for the first item to be replaced in said user preferences 190. Other items stored in the media content database 180 which are similar to the first item to be replaced in conformity with one or many parameters, e.g. a genre, language, author, duration, etc. may also be ranked with the lower rating to have the consistent rating for items in database 180.

The search means may also be arranged to indicate the selection of the particular second item for replacing the particular first item in the media content database 180 or the user preferences 190. In this way, if some other first item has to be replaced in future, the search means may ascertain whether the replacement in the past was indicated in the database 180 or the user preferences 190 for the first item which is similar to said future first item, e.g. by the genre, duration, etc. From said stored information about indicated replacement, the search means retrieve the second item which was used in the past for replacing the similar first item. Thus, said retrieved second item may also be used for replacing the first item in the future.

Alternatively, the search means may communicate a request to an external rating source, e.g. the Internet, for determining the rating of the second item according to a rating list of (inter) national survey, and so on. Alternatively, the second item may be selected on the basis of a date when an entry, i.e. the record, for said item was created in the database or a release date, e.g. of the song, etc. In this way, the item that has the newest date is selected.

In the broadcasting content, some "favorite" songs may be played several times a day, while older and/or less liked songs may be played once a week. The apparatus may be arranged to maintain a history of reproducing the items, and to select the second item taking into account a frequency of outputting the second item in accordance with said history.

A time of searching at least one second media item may vary from a very short period of time, e.g. less than a second which may not be perceptible by the user, up to several tens of seconds. This search time may be taken into account to eliminate a pause between stopping outputting of the first item upon user input of the replacing command and starting outputting of the second item when it is found. One of the possibilities is to continue outputting the first item until the second item is found, and correspondingly to deduct said search time from the searched duration of the second item. In other words, the second item with the duration decreased for said searched time may be searched for. In one example, an algorithm of setting an approximate, e.g. average search time preset by a manufacturer, search time, and adjusting said setting time in the course of exploitation of the apparatus, e.g. depending on the amount of records to be analyzed in the database 180, may be realized. Similarly, a time required for estimating the duration of the remaining part of the first item as described above may also be taken into account.

Once the second media item is found and selected by the search means, it may be further communicated to the output means to be reproduced to the user.

It may happen that not one second item with the required duration is found, and it is neither possible to find two or more second items, the summary duration of which is substantially equal to the estimated duration of the remaining part of the first item. For example, the search means may be arranged to search for the second item which has a duration not ten seconds longer and not several seconds shorter than the estimated duration of the remaining part of the first item, and the items within said duration range are not present in the database 180. One of the measures to solve the problem is to find the second item having the duration closest to said duration range. Then, the output means may be arranged to adjust the output of the found second item to the estimated duration of the remaining part of the first item. If such a second item is temporally shorter than the estimated duration of the remaining part of the first item, then the outputting of the first item is continued for the time difference between the duration searched for and the actual duration of the found second item. If such a second item is temporally longer than the estimated duration of the remaining part of the first item, then the output means 120 may be arranged to fade out the output of the second item upon expiration of the estimated duration of the remaining part of the first item.

In one of the embodiments of the present invention, the search means may be arranged to search for a replacement of the item being outputted without waiting for the user inputting the replacement command, e.g. since the output of this particular item commenced. In this way, a substitution list may be created by the search means. The substitution list may comprise records of a time interval and a second item which would be selected by the search means if the user inputted the command to replace the item being outputted at the moment when the duration of the remaining part of said item being outputted was equal to said time interval of the record in the list. The list may be renewed whenever the output of the item is started. Obviously, this may be realized to decrease the time of searching the second item.

It should be noted that the duration database 160 and media content database 180 may be arranged in one database storing the same information, or in any other way.

The apparatus according to the present invention may be realized with a microprocessor system comprising a processor controlling the operation of a television receiver in conventional manner. The processor may receive user control instructions from the remote control unit used by the user. The processor may be coupled to a memory storing instructions executed by said processor, the databases 160 and 180, and user preferences 190, to enable the apparatus as described above. In another embodiment, hardware circuitry may be used in place of, or in combination with software instructions to implement the present invention. Obviously, the apparatus according to the present invention may be implemented in consumer electronics devices capable of reproducing and operating with media content, such as a television set, set-top box, radio, personal computer, etc. in a manner apparent to the person skilled in the art.

Figure 2:
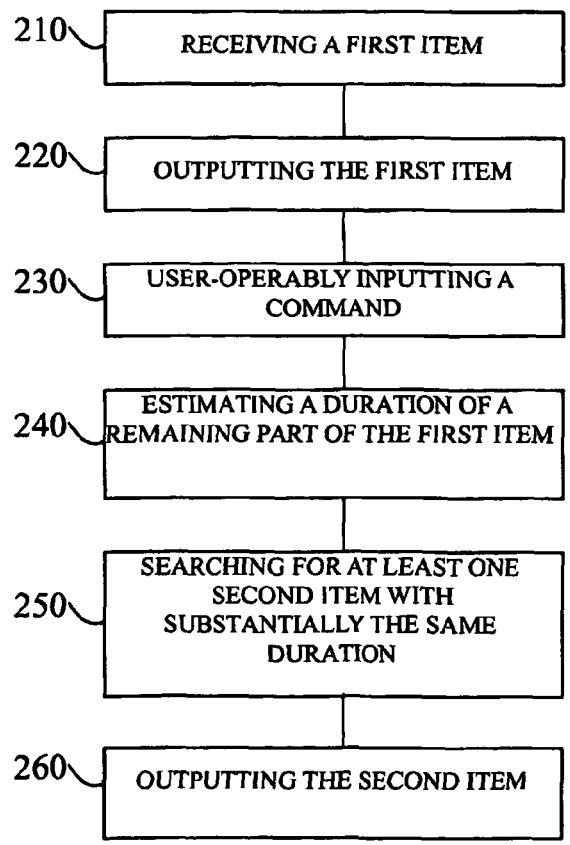
FIG. 2 shows an embodiment of the method according to the present invention.

FIG. 2 shows an embodiment of the method of the present invention. In step 210, the first media content item is received by the receiver 110 to be outputted by the output means 120 in step 220. Steps 210 and 220 represent a regular use of the user device for reproducing media content, such as playing audio by means of a CD player or radio, etc. In step 230, the user may input a command to interrupt reproducing the first item and replace the first item by outputting the second media content item.

In many situations, a consecutive playback of media items may be predetermined by the user or content provider. Therefore, the following steps of the method may be performed to find such a second item which may be reproduced before an output of another item will start as predetermined. In step 240, the duration of the remaining part of the first item is estimated, that is the part of first item that remains not outputted because the user interrupted the outputting of the first item, as described above. In step 250, at least one second item having the duration which is substantially equal to the estimated duration of the remaining part of the first item is searched for. If more than one second item is found, one second item may be selected, as described above. If no second item can be found at all, the second item having the duration closest to the estimated duration of the remaining part of the first item is searched for. The found second item is outputted in step 260.

The expression "substantially equal duration" should not be understood in a limited way. The apparatus may be arranged to adjust the duration of the reproduction of the particular item. It is known to the person skilled in the art that the playback duration of the media content may be slightly compressed or made a bit longer, which may not be noticed by the user. The "duration" of the items may be presented as an interval having a minimal and maximal length instead of the single value.

Figure 3:
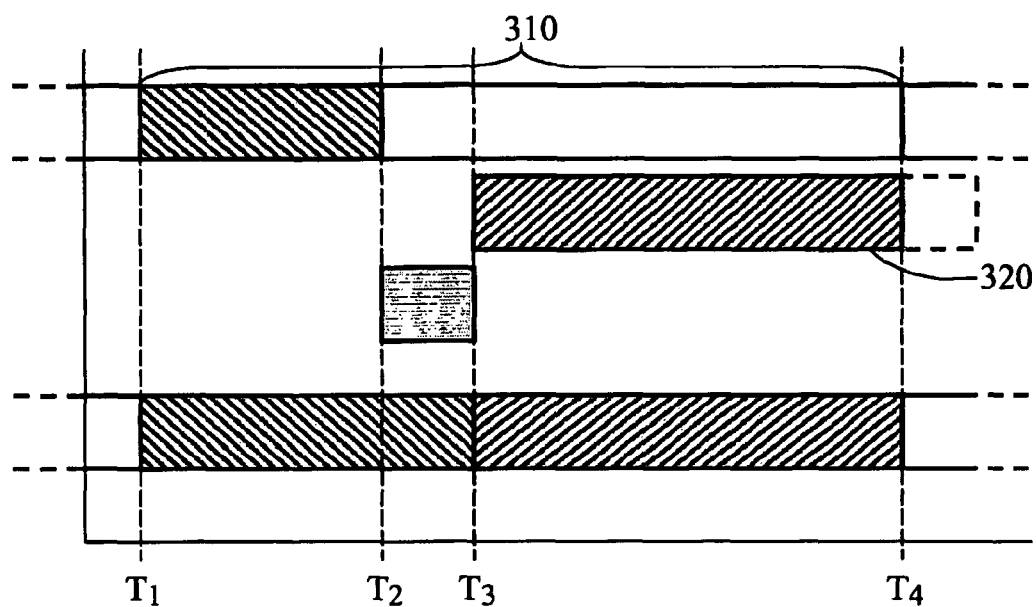
FIG. 3 shows a time diagram elucidating the functioning of the apparatus.

FIG. 3 shows a time diagram illustrating the functioning of one of the embodiments of the apparatus according to the present invention. The apparatus 100 may be instructed to start outputting, e.g. reproducing, the first media content item 310 at the moment T1 and finish outputting the first item at the moment T4, which may be equal to the duration of the first item. Outputting of another item may be started by the apparatus at the moment T4. At the time T2, the user may instruct the apparatus to replace the outputting of the first item. By the time T3, the apparatus may find the second item 320 for substituting the first item, wherein the output of the second item has to be finished by the time T4. During the period of time from T2 to T3, the step 240, step 250 and the embodiments of said steps as described above may be performed. The output of the first item may be continued until the time T3 because otherwise nothing will be reproduced during the period of time from T2 to T3. The output of the second item 320 is started at the moment T3 and finished at the moment T4, which is equal to the duration of the remaining part of the first item that is decreased for the time necessary to perform the step 240, step 250, etc. to find the second item. It may happen that the found second item is longer than the period of time from T3 to T4. In that case, the output means 120 may fade out the outputting of the second item at the moment T4.

The object of the invention is achieved in that the apparatus, method and various embodiments of them are provided with reference to the accompanying drawings. The apparatus allows the user to replace the outputted item in a more efficient manner, and may be more easily implemented in the currently utilized consumer electronics devices than is known in the prior art with the additional requirements imposed on the content provider equipment and user devices. The various program products may implement the functions of the system and method of the present invention and may be combined in several ways with the hardware or located in different devices. Variations and modifications of the described embodiment are possible within the scope of the inventive concept.

The invention claimed is:

1. An apparatus for outputting media content items, the apparatus comprising:
   an output device arranged to output a first media content item to a user;
   a timer arranged to determine a duration of said first media content item;
   a selector arranged for receiving a command to replace said first media content item at a particular time while outputting said first media content item;
   a time-estimating device arranged to estimate, upon receipt of said command, a remaining time necessary for outputting a remaining part of said first media content item, the remaining time being measured from substantially said particular time to an end of the duration of said first media content item; and
   a search device arranged to search for at least one second media content item, wherein a duration of said at least one second item is substantially equal to said remaining time,
   wherein said time-estimating device is further arranged to estimate a time of searching said at least one second media content item, and to decrease said remaining time by said estimated time of searching.

2. The apparatus of claim 1, wherein said output device is arranged to replace the remaining part of said first media content item with said at least one second media content item.

3. The apparatus of claim 2, wherein said output device is arranged to fade out the output of said at least one second media content item upon expiration of said remaining time.

4. The apparatus of claim 1, further comprising a database for maintaining durations of the media content items, wherein said time estimating device is arranged to determine a duration of said first media content item by identifying said first media content item in the database.

5. The apparatus of claim 4, further comprising:
   a receiver arranged to receive broadcast media content items; and
   a monitoring device arranged to identify a particular broadcast media content item and to store in said database a duration of said particular broadcast media content item upon completion of receiving said particular broadcast media content item.

6. The apparatus of claim 4, wherein said search device is arranged to search for said at least one second media content item in the database.

7. The apparatus of claim 1, wherein said search device is arranged to establish for the first media content item being outputted a substitution list having at least one element indicating the at least one second media content item to be used for replacing said first media content item at the particular time of outputting said first media content item.

8. The apparatus of claim 7, wherein the substitution list is renewed whenever a new first media content is outputted by the output device.

9. The apparatus of claim 1, wherein said search device is further arranged to select one of the second media content items having the duration which is substantially equal to said remaining time, based on user preferences of the user.

10. The apparatus of claim 1, wherein said search device is further arranged to indicate a dislike of the user of said first media content item in the user preferences.

11. The apparatus of claim 1, wherein said first and second media content items are audio content items.

12. The apparatus of claim 11, wherein said first and second media content items are radio broadcast programs.

13. The apparatus of claim 1 wherein, in response to the command, the output device is configured to interrupt outputting the first media content item upon expiration of a search time for finding the at least one second media content item.

14. The apparatus of claim 1 wherein, in response to the command, the output device is configured to interrupt outputting the first media content item upon finding the at least one second media content item.

15. The apparatus of claim 1, wherein the media content items includes a sequence including the first media content item consecutively followed by a third media content item, and wherein the output device is configured to fade out the output of the at least one second media content item upon expiration of the remaining time when the duration of the at least one second item is longer than the remaining time and to output the third media content item upon the expiration of the remaining time.

16. The apparatus of claim 1, wherein the search device is configured to search for two or more second items having a total duration of substantially equal to the remaining time for replacing the remaining part of the first media item with the two or more second items.

17. A consumer electronics device selected from a television set, personal computer, audio player, and portable equipment for outputting media content items, the device comprising:
   output device arranged to output a first media content item to a user;
   a timer arranged to determine a duration of said first media content item;
   a selector for receiving a command to replace said first media content item at a particular time while outputting said first media content item;
   a time-estimating device arranged to estimate, upon receipt of said command, a remaining necessary for outputting a remaining part of said first media content item measured from substantially said particular time to an end of the duration of said first media content item; and
   a search device arranged to search for at least one second media content item, wherein a duration of said at least one second media content item is substantially equal to said remaining time,
   wherein said time-estimating device is further arranged to estimate a time of searching said at least one second media content item, and to decrease said remaining time by said estimated time of searching.

18. A method of outputting media content items by a consumer electronics device, the method comprising the acts of:
   outputting a first media content item to a user by the consumer electronics device, receiving a command to replace said first media content item at a particular time of outputting said first item, determining a duration of said first media content item, estimating, upon receipt of said command, a remaining time necessary for outputting a remaining part of said first media content item, the remaining time being measured from substantially said particular time to an end of the duration of said first media content item, and searching for at least one second media content item, wherein a duration of said at least one second media content item is substantially equal to said remaining time, wherein the estimating act estimates a time of searching said at least one second media content item, and decreases said remaining time by said estimated time of searching.

19. A computer program product enabling a programmable device, when executing said computer program product, to function as an apparatus for outputting media content items having durations, the apparatus comprising:

an output device arranged to output a first media content item to a user;

a timer arranged to determine a duration of outputting of said first media content item;

a selector arranged for receiving a command to replace said first media content item at a particular time while outputting said first media content item;

a time-estimating device arranged to estimate, upon receipt of said command, a remaining time necessary for outputting a remaining part of said first media content item, the remaining time being measured from substantially said particular time to an end of the duration of said first media content item; and a search device arranged to search for at least one second media content item, wherein a duration of said at least one second media content item is substantially equal to said remaining time, wherein said time-estimating device is further arranged to estimate a time of searching said at least one second media content item, and to decrease said remaining time by said estimated time of searching.

* * * * *